(12) United States Patent
Müller et al.

(10) Patent No.: US 7,866,571 B2
(45) Date of Patent: Jan. 11, 2011

(54) PORTABLE SPRAYING DEVICE

(75) Inventors: Matthias Müller, Remshalden (DE); Thomas Stark, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 629 days.

(21) Appl. No.: 11/835,483

(22) Filed: Aug. 8, 2007

(65) Prior Publication Data
US 2008/0035758 A1 Feb. 14, 2008

(30) Foreign Application Priority Data
Aug. 10, 2006 (DE) .................. 10 2006 037 459

(51) Int. Cl.
*A62C 15/00* (2006.01)
*B05B 9/08* (2006.01)
*B05B 7/12* (2006.01)
*B05B 9/01* (2006.01)
*A01G 25/14* (2006.01)
*F23D 11/46* (2006.01)

(52) U.S. Cl. .................. 239/154; 239/152; 239/375; 239/407; 239/413; 239/414; 239/525

(58) Field of Classification Search .................. 239/152, 239/154, 289, 337, 375, 378, 407, 408, 409, 239/413, 414, 417.5, 418, 525, 526, 527, 239/528
See application file for complete search history.

(56) References Cited

U.S. PATENT DOCUMENTS

| 4,552,100 A | * | 11/1985 | Kawaharazuka et al. | 123/2 |
| 5,133,300 A | * | 7/1992 | Miura | 123/2 |
| 5,813,088 A | * | 9/1998 | Wagner et al. | 15/327.5 |
| 6,371,388 B2 | * | 4/2002 | Utter et al. | 239/419 |
| 6,834,413 B2 | * | 12/2004 | Sanders et al. | 15/405 |

* cited by examiner

*Primary Examiner*—Len Tran
*Assistant Examiner*—Ryan Reis
(74) *Attorney, Agent, or Firm*—Gudrun E. Huckett

(57) ABSTRACT

A portable spraying device has an internal combustion engine and a blower driven by the internal combustion engine. A blower tube is connected to the blower and conveys a blowing air stream generated in the blower. A spraying agent reservoir is provided and a spraying agent line is connect to the reservoir and conveys a spraying agent stream from the reservoir into the blowing air stream. A control valve is arranged in the spraying agent line. A throttle control acts on the internal combustion engine for controlling an engine output. A stop switch acts on the internal combustion engine for interrupting ignition. An actuating element acts on the control valve for actuating the control valve to control the spraying agent stream. A handle with a handle head is provided and the throttle control, the stop switch, and the actuating element are arranged in the handle head.

18 Claims, 7 Drawing Sheets

PORTABLE SPRAYING DEVICE

BACKGROUND OF THE INVENTION

The invention relates to a portable spraying device comprising a blower for conveying a blowing air stream through a blower tube and an internal combustion engine for driving the blower. The spraying device (sprayer) further comprises a spraying agent line for guiding a spraying agent stream from a reservoir into the blowing air stream, wherein a control valve for controlling the spraying agent stream is arranged in the spraying agent line. A handle is provided. A throttle control for controlling the power of the internal combustion engine, a stop switch for interrupting ignition of the internal combustion engine, and an actuating element for actuating the control valve for the spraying agent stream are provided also.

For plant protection purposes or the like, portable spraying devices are used with which a spraying agent is applied to the plants. Such a spraying device has a blower for conveying a blowing air stream through the blower tube. An internal combustion engine of the spraying device drives a blower that conveys the blowing air flow through the blower tube. A spraying agent line opens into the blowing air stream and supplies a liquid spraying agent stream from a reservoir into the blowing air stream. In this connection, the liquid spraying agent is atomized and carried by the blowing air stream to the plants to be treated.

For starting the internal combustion engine, the spraying device is placed on the ground. After having adjusted the carburetor as needed, the internal combustion engine is started. In operation, the spraying device is, for example, carried by means of a carrying frame on the operator's back. When the motor is running, the control actions of the operator are limited to selecting a suitable engine output with a throttle control, adjusting the desired mass flow of the spraying agent, and holding the blower tube in the desired direction.

For directing the blower tube in the desired direction, a handle is provided on the blower tube; it is gripped by the hand of the user for guiding the blower tube. Moreover, a throttle control for controlling the output of the internal combustion engine, a stop switch for interrupting ignition of the internal combustion engine, and an actuating element for actuating a control valve for controlling the spraying agent stream are provided.

For ensuring a permanent and fatigue-free working, an ergonomic shaping of the handle is required. For this reason, the handle cannot surpass a certain size. The space available for control elements of any kind is thus limited. In known configurations, only the throttle control and the stop switch are therefore provided on the handle. Further control elements such as the cold start devices are arranged directly on the carburetor. The actuating element for the control valve for controlling the spraying agent stream is arranged directly on the control valve.

For controlling all functions required when operating the sprayer, it is either necessary to frequently move the hand from the handle to the various actuating elements or to use the other hand. The operation of the spraying device is therefore cumbersome.

SUMMARY OF THE INVENTION

It is an object of the present invention to further develop a portable spraying device of the aforementioned kind such that a simplified handling is possible.

In accordance with the present invention, this is achieved in that the handle has a handle head in which the throttle control, the stop switch, and the actuating element for the control valve are arranged.

Accordingly, it is proposed that the handle, provided in particular on the blower tube, is provided with a handle head on which the throttle control, the stop switch, and the actuating element for the control valve are arranged. The handle head projects in the direction of the free end of the handle past the gripping area and is not gripped by the hand. The gripping area can therefore be slim and shaped ergonomically. The handle head which projects past the gripping area can be of a large volume so as to provide space for the throttle control, the stop switch, and the actuating element for the control valve without restricting easy handling of the handle. All three operating components are accessible by the hand while the hand still grips the gripping area of the handle. It is not necessary to position the hand differently or use the other hand for actuating any of the operating elements. The user is able during operation to adjust the engine output and thus the intensity of the blowing air stream as well as the mass flow of the spraying agent. Without repositioning the hand, the motor can be switched off by means of the stop switch, if needed.

In a preferred embodiment, the actuating element for the control valve is a spray pushbutton with at least one portion of its actuating travel providing an automatic return action. Preferably, the spray pushbutton is pivotably supported and forms together with a transmission member connected to the control valve an elbow joint that is embodied to lock automatically when a predetermined travel stroke is being surpassed.

In this way, the user can control four different functions without repositioning his hand on the handle: In addition to selecting the throttle position and the stop function, a short spray pulse or a permanent spraying action can be selected by means of the spray pushbutton. When partially suppressing the spray pushbutton, the spraying agent stream is released momentarily. Immediately after releasing the spray pushbutton, the automatic return interrupts the spraying agent stream. The spraying agent can thus be applied in a pulsed fashion by not fully, and only briefly, pushing down the spray pushbutton, for example, by means of the thumb. Should the spray pushbutton however be completely suppressed, the arrangement of the elbow joint leads to automatic locking as the predetermined actuating travel stroke is surpassed. The spraying agent is thus released as a permanent mass stream without the user having to suppress the spray pushbutton permanently.

The control valve is expediently configured as a spring-loaded linear valve that opens under tensile load wherein the transmission member is a pull rod. The tensile load that is provided in the form of a prestressed spring enables a configuration that is almost free of any play and is comparatively rigid. The spraying agent stream can be metered precisely. The spring pretension of the linear valve in the direction toward its closed position can be used at the same time for restoring the actuating element or the spray pushbutton. Locking, releasing, and restoring the closed position of the entire control arrangement is realized automatically simply by means of the corresponding spring element in the valve. Only minimal actuating forces are required for achieving a high control precision.

In a preferred embodiment, the spraying agent line passes through the handle and the control valve is arranged within the handle. The transmission member passes from the handle head through the gripping area to the internally positioned control valve. This arrangement saves space. The control valve and the transmission member are protected from external influences such as soiling and the like.

In a preferred embodiment, the stop switch has a double function and acts also as a locking element for the throttle control. In particular, the stop switch is embodied as a pivot lever that, starting from a neutral position, can be pivoted in a stop direction and, when doing so, the pivot lever actuates an interruption switch, in particular, in the form of a microswitch; starting from the neutral position, the pivot lever can be pivoted in a locking direction that is opposite to the stop direction and, when doing so, the pivot lever locks the throttle control in an operating position.

Despite the limited size and the arrangement of a total of three control members, the number of functions that can be actuated by the user has been expanded without this requiring that the hand must be removed from the handle. By pivoting the pivot lever in the locking direction, the throttle control is locked in the operating position. The throttle control can be let go off while a permanent, at least approximately constant, blowing air stream is conveyed. Speed fluctuations of the motor and of the blower are avoided. A constant ratio of blowing air stream to spraying agent stream is ensured in permanent operation. The thus resulting optimal distribution process enables that not more spraying agent as required is distributed.

Without repositioning the hand on the handle, the pivot lever can be pivoted with the same hand in the opposite direction. The locking action of the throttle control is released and the stop switch is actuated. The operation of the spraying device can be interrupted precisely.

In a preferred embodiment, when actuating the pivot lever in the locking direction coupling to the throttle control is provided in such a way that with increasing actuation travel of the pivot lever an increasing pivoting of the throttle control in the direction of its full throttle position is realized. Advantageously, coupling between the pivot lever and the throttle control is realized by a cam disk or a rocker arm. In this way, it is possible to provide a power selection for the internal combustion engine based solely on actuation of the pivot lever without actuation of the throttle control. With only one finger or thumb without having to reposition the hand and without actuating the throttle control, the desired engine power can be selected and locked for permanent operation. Coupling between pivot lever and throttle control by means of a cam disk or a rocker arm still enables actuation of the throttle control independent of the pivot lever. Without abandoning the power output that has been previously adjusted by means of the pivot lever, momentarily the engine output can be raised by means of the throttle control. After releasing the throttle control, the motor will return into the previously adjusted and locked output position.

In an expedient embodiment, the stop switch is connected with a friction spring that travels on a slanted slideway. Preferably, the friction spring is configured as an approximately U-shaped spring bracket that is clamped between and moveable together with the pivot lever between two arc-shaped slideways. The thus resulting spring-tensioned sliding friction enables a fine and continuous adjustment of the stop switch or the pivot lever in the stop position, neutral position or any throttle position. Providing the slanted portion facilitates finding the neutral position.

The handle comprises expediently two half shells that are detachably connected to an surround the blower tube wherein the two half shells are attached clampingly on the blower tube. After releasing the clamping connection, the handle can be moved within a predetermined area along the blower tube and then be attached again in a different position. The arrangement of the blower tube and handle can therefore be adjusted to the different ergonomic requirements of different users.

DESCRIPTION OF THE PREFERRED EMBODIMENTS

Figure 1:
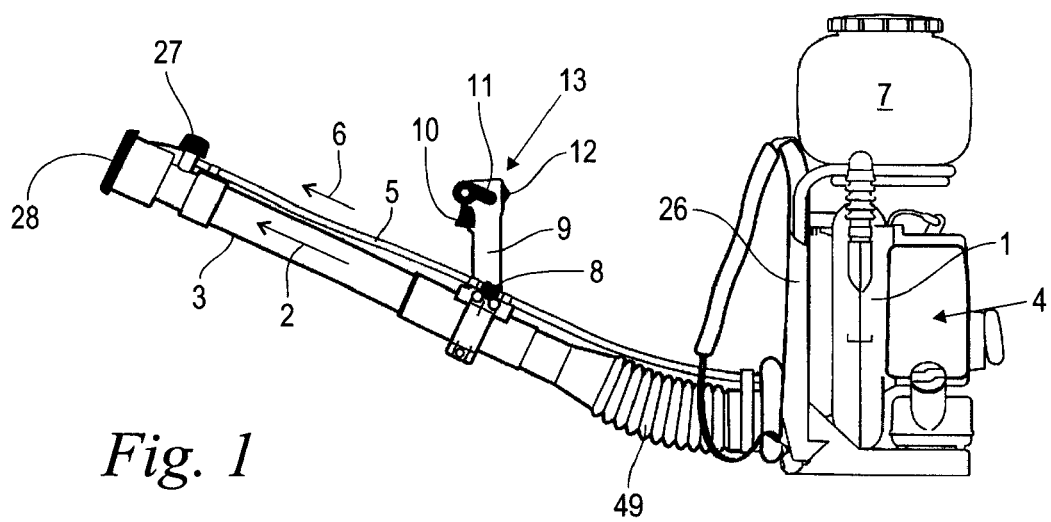
FIG. 1 shows schematically in a side view a spraying device (sprayer) in accordance with the present invention comprising a blower tube and a spraying agent line as well as a handle on the blower tube, wherein a throttle control, a stop switch, and an actuating element for actuating the control valve for the spraying agent stream are arranged on the handle head of the handle.

FIG. 1 shows in a schematic side view a portable spraying device (sprayer) with a backpack carrying frame 26 on which a blower 1, an internal combustion engine 4, and a reservoir 7 are mounted. The internal combustion engine 4 operates the blower 1 that is embodied as a radial blower. The blower tube 3 is elastically connected by means of bellows 49 to the blower 1. The blowing air stream generated by the blower 1 and illustrated by arrow 2 is deflected by means of the blower tube 3 to the desired application location. A spraying agent line 5 extends from the reservoir 7 to a nozzle 27 by means of which the spraying agent line 5 opens into the blower tube 3 at its free end 28. By means of a conveying pump, not illustrated, driven by the internal combustion engine 4, a spraying agent stream 6 indicated by arrow 6 is generated and, coming from the reservoir 7, is introduced through the spraying agent line 5 and the nozzle 27 into the blowing air stream 2. The spraying agent stream 6 is atomized at the exit of the nozzle 27 into the blowing air stream 2 and is conveyed together with the blowing airstream 2 to the location of application. In this connection, a plant protection agent with which plants are to be sprayed is of particularly interest as a spraying agent.

For starting the internal combustion engine 4, the spraying device is placed on the ground. In the area of a carburetor, not illustrated, of the internal combustion engine 4, a cold start device, also referred to as a choke, and possibly also a venting pump are arranged. Moreover, there is also a pull starter, not illustrated, provided on the internal combustion engine 4. The aforementioned devices are actuated in the shut-down state of the sprayer.

After the internal combustion engine 4 has been started, the spraying device is carried by means of the backpack carrying frame 26 on the back of the operator. A handle 9 is attached to the blower tube 3 and is gripped by the hand of the operator. By means of the handle 9 the operator can direct the blower tube 3 that is elastically suspended by means of the bellows 49 in the desired direction. During operation while carrying the sprayer on his back, the operator has three operating elements available: a throttle control 10 for power control of the internal combustion engine, a stop switch 11 for interrupting ignition of the internal combustion engine 4, as well as an actuating element 12 for actuating a control valve 8 that is arranged in the spraying agent line 5 and provided for controlling the spraying agent stream 6. For this purpose, the handle 9 has at its free end facing the blower tube 3 a handle head 13. On the handle head 13, the throttle control 10, the stop switch 11, and the actuating element 12 for the control valve 11 are arranged in such a way that they can be actuated by the thumb or finger of the hand that grips the handle 9 without having to let go of the handle 9.

Figure 2:
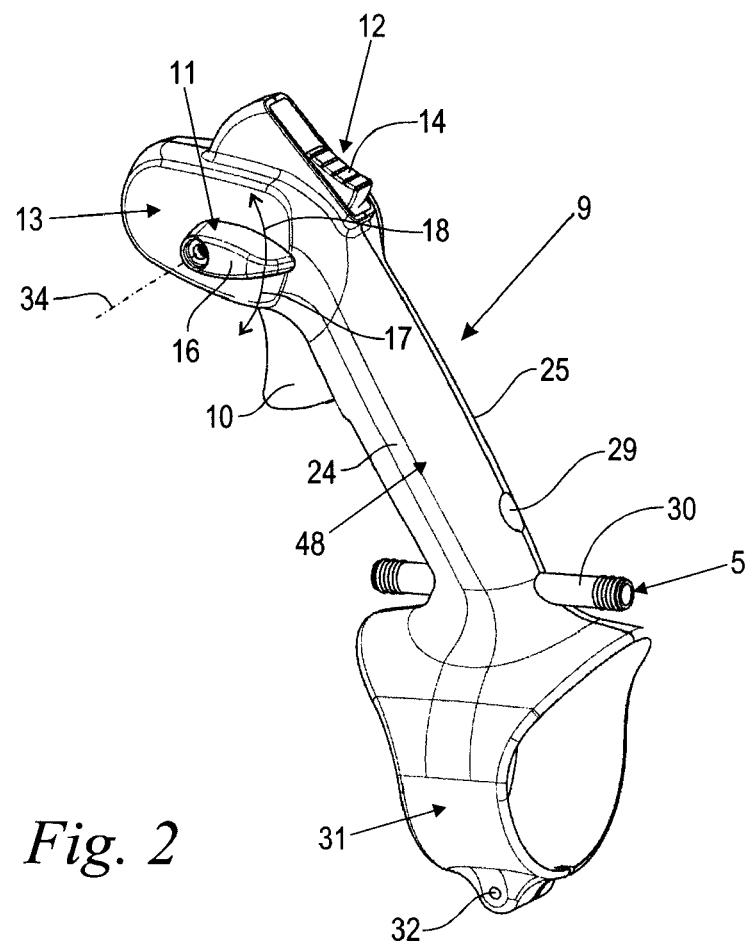
FIG. 2 is a perspective view of an embodiment of the handle according to FIG. 1 with details of the arrangement of the control elements on the handle head.

FIG. 2 shows a perspective view of an embodiment of the handle 9 according to FIG. 1. The handle 9 comprises two half shells 24, 25 that are made from plastic material by injection molding and that are essentially mirror-symmetrical to one another; together they form a gripping area 48 to be gripped by the hand, the handle head 13 as well as an attachment section 31. On the bottom end of the attachment section 31 opposite the gripping area 48 a screw connection 32 is provided. In the mounted state, the attachment section 31 that is ring-shaped surrounds the blower tube 3 (FIG. 1) and, when the screw connection 32 is tightened, is clamped on the blower tube 3 (FIG. 1). After releasing the screw connection 32, the clamping action is released so that the handle 9 can be displaced and can be secured in different positions on the blower tube 3 (FIG. 1).

The end of the gripping area 48 that is opposite the attachment section 31 is adjoined by the handle head 13 that, relative to the working position illustrated in FIG. 1, projects forwardly and upwardly past the gripping area 48. The handle head 13 is larger with regard to its cross-section than the gripping area 48 and is not designed to be gripped by the hand. Near the top side of the handle head 13, the actuating element 12 for the control valve 8 (FIG. 1) is arranged adjacent the gripping area 48. In the illustrated embodiment, the control element 12 is configured as a pivotably supported spray pushbutton 14 whose function will be explained in more detail in connection with FIGS. 3 through 5.

Relative to the longitudinal direction starting at the carrying frame 26 and extending toward the free end 28 (FIG. 1), on a left lateral surface of the handle head 13 the stop switch 11 is arranged that is supported so as to be pivotable about a pivot axis 34 that extends transversely to the aforementioned longitudinal direction. When the sprayer is used by a right-handed person, the left-sided arrangement of the stop switch 11 enables an actuation by the thumb without the hand having to be removed from the gripping area 48. The actuation element 12 is arranged on the handle head 13 so close to the gripping area 48 on its topside that it can be actuated as needed by the thumb or another finger of the hand gripping the handle without having to let go off the gripping area 48.

On the bottom side of the handle head 13 opposite the actuating element 12 and facing the blower tube 3 (FIG. 1), the pivotable throttle control 10 is arranged in the transition area to the gripping area 48. This throttle control 10 can be actuated by means of the fingers without repositioning the hand gripping the gripping area 48. It acts on a throttle pull 36 (FIG. 6), disclosed in more detail infra, that passes through a passage 29 in the seam area between the two half shells 24, 25 from the interior of the handle 9 in the direction toward the internal combustion engine 4 (FIG. 1).

The stop switch 11 is configured as a pivot lever 16 that is pivotably supported on pivot axis 34 and has a double function in that it acts as a locking element for the throttle control 10. For this purpose, the pivot lever 16 can be pivoted as needed in a stop direction 17 for interrupting ignition and thus shutting down the internal combustion engine 4 (FIG. 1) or in the opposite direction in a locking direction 18 for locking the throttle control 10 and thus for locking the desired engine output in operation. Details for this are explained in more detail in connection with FIGS. 6 to 8.

Figure 3:
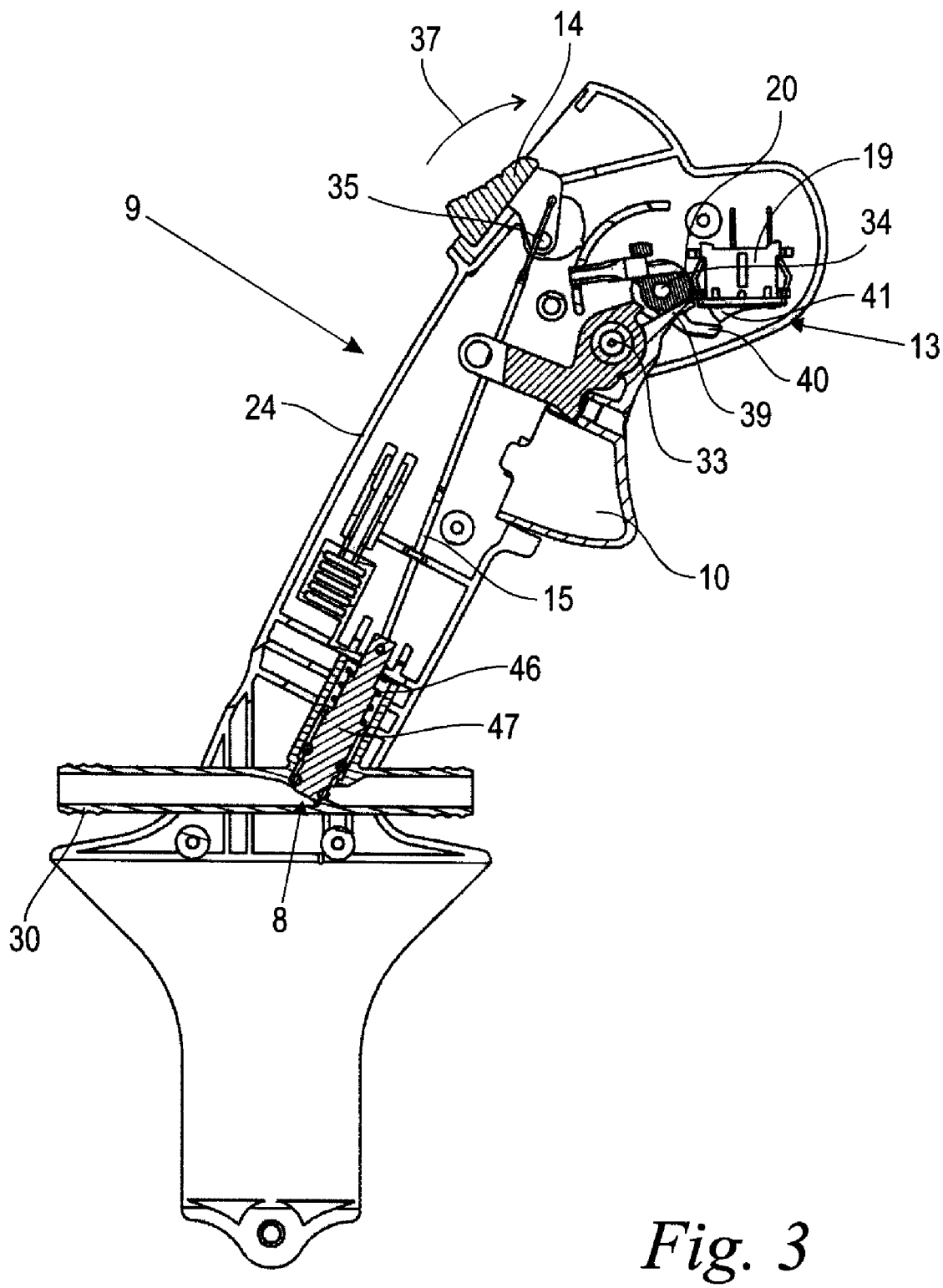
FIG. 3 is a longitudinal section illustration of the handle according to FIG. 2 showing details of the closed control valve arranged thereat as well as a spray pushbutton in the rest position.

A portion of the spraying agent line 5 is configured as a tube socket 30 that extends parallel to the axis of the blower tube 3 (FIG. 1) near the attachment section 31 through the handle 9. The longitudinal section illustration according to FIG. 3 shows that the control valve 8 for controlling the spraying agent stream 6 (FIG. 1) and the tube socket 30 form a unitary part; the control valve 8 is embodied as a spring-loaded linear valve. For this purpose, the control valve 8 comprises a valve body 47 that is longitudinally movable transverse to the longitudinal axis of the tube socket 30 and approximately parallel to the longitudinal axis of the handle 9; the valve body 47 is held in the illustrated closed position by means of a pressure spring 46.

The spray pushbutton 14 that is pivotably supported about pivot axes 35 on the handle 9 is illustrated in a rest position in which the control valve 8 is closed. The spray pushbutton 14 is connected by means of transmission member 15 to the control valve 8. The transmission member 15 is a pull rod and is hooked to the lower end to the valve body 47 and at the opposite upper end is hooked to the spray pushbutton 14. The spray pushbutton 14 projects partially past the contour of the handle 9. On the side opposite the projecting part, the transmission member 15 is hooked into the spray pushbutton 14 and extends on this side at a spacing to the pivot axis 35. In this way, under the effect of the pressure spring 46, the spray pushbutton 14 is pretensioned in a direction counter to the actuation direction 37 indicated by arrow 37 and beginning at the illustrated rest position.

The illustration according to FIG. 3 also shows that the throttle control 10 within the handle 9 is pivotably supported about pivot axis 33 in the handle head 13. Moreover, within the handle head 13 an interruption switch 19 in the form of a microswitch with switching element 41 is arranged. A cam disk 38 and a lever 40 are pivotable together with pivot lever 16 (FIG. 2) about pivot axis 34 and are also positioned within the handle head 13. The cam disk 38 acts on a pressure surface 39 of the throttle control 10 while the lever 40 acts on the switching element 41 of the interruption switch 19. Details in regard to this will be described in connection with FIGS. 6 to 8.

The illustration according to FIG. 3 shows the inner view of the half shell 24 of the handle 9. In the mounted state, an inner cavity of the handle 9 is formed together with the substantially mirror-symmetrically configured additional half shell 25 (FIG. 2); within the inner cavity, the control valve 8, the interruption switch 19 as well as the support for the spray pushbutton 14, the throttle control 10, and the pivot lever 16 (FIG. 2) together with the cam disk 38 and lever 40 are arranged.

Figure 4:
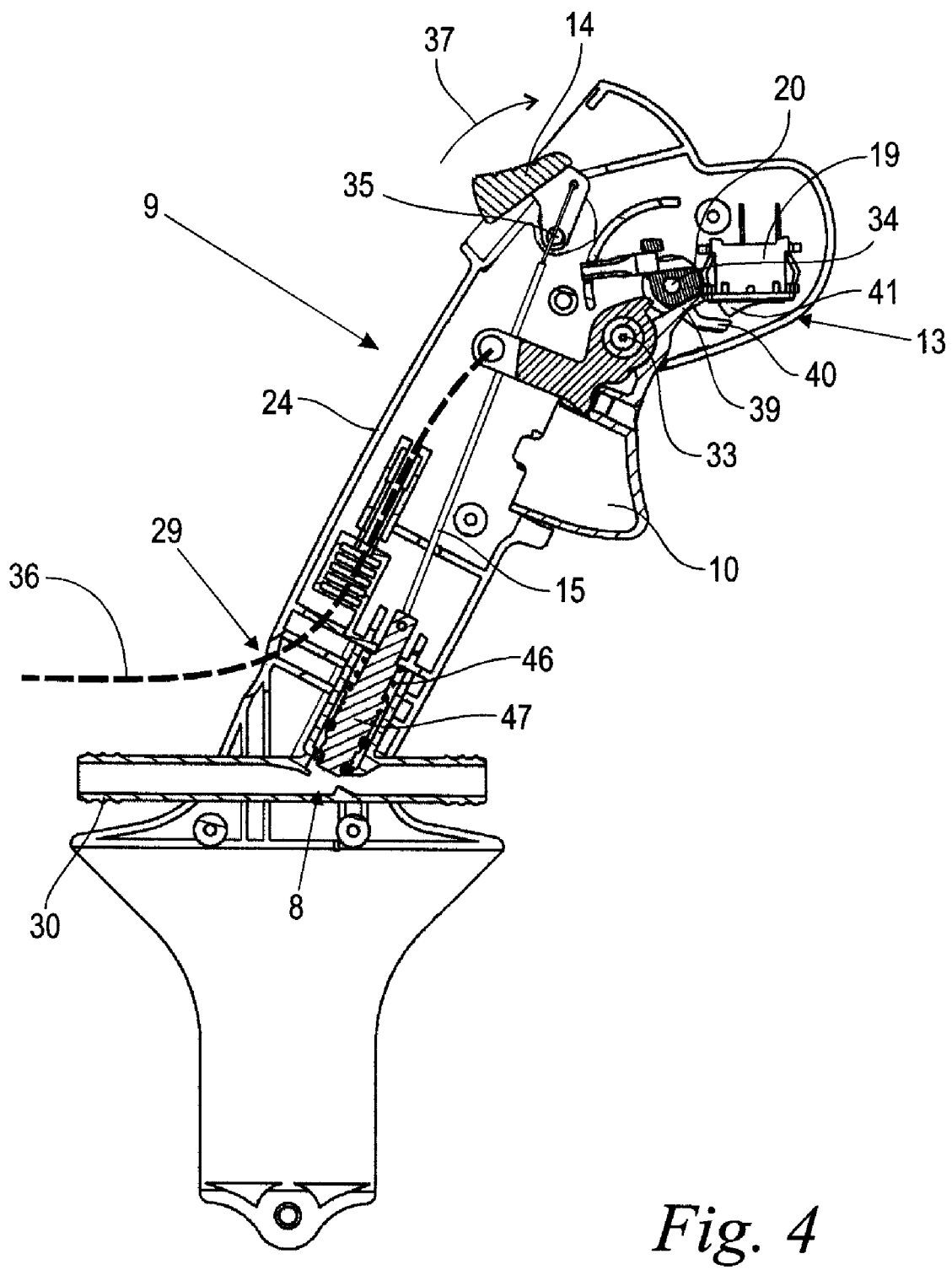
FIG. 4 shows the arrangement according to FIG. 3 with partially suppressed spray pushbutton and open control valve for generating a spray pulse.

FIG. 4 shows the arrangement according to FIG. 3 with partially suppressed spray pushbutton 14. In comparison to the starting position of FIG. 3, the spray pushbutton 14 is partially suppressed in the actuation direction 37. As a result of this pivot movement, a tensile force is exerted on the valve body 47 by means of the transmission member 15 embodied as a pull rod in a direction opposite to the force of the pressure spring 46. As a result, the valve body 47 reaches its open position illustrated in FIG. 4 in which the cross-section of the tube socket 30 is released. Therefore, a spraying agent stream 6 will result in the spraying agent line 5 (FIG. 1).

The control valve 8 that opens under the pulling load has the tendency under the action of the pre-tensioned pressure spring 46 to return automatically into the closed position according to FIG. 3. In this connection, the pressure spring 46 by means of valve body 47 exerts a pulling force on the hooked transmission member 15. In the partially suppressed position of the spray pushbutton 14 according to FIG. 4 as well as in the closed position according to FIG. 3, the transmission member 15 extends on the outer side of the pivot axis 35, i.e., between the pivot axis 35 and the outwardly projecting part of the spray pushbutton 14. Under the action of the pulling load, the spray pushbutton 14 is therefore pretensioned opposite to the actuation direction 37 and therefore is subject to an automatic restoring action. Starting from the rest position of FIG. 3, a short, not fully applied pressure on the spray pushbutton 14 has the effect that the position according to FIG. 4 is reached. The tensile stress in the transmission member 15 has the effect that the spray pushbutton 14 and the valve body 47, immediately after release, return into the closed initial position according to FIG. 3. By short suppression of the spray pushbutton 14, short spray pulses are thus possible with the spraying agent stream 6 (FIG. 1).

Figure 5:
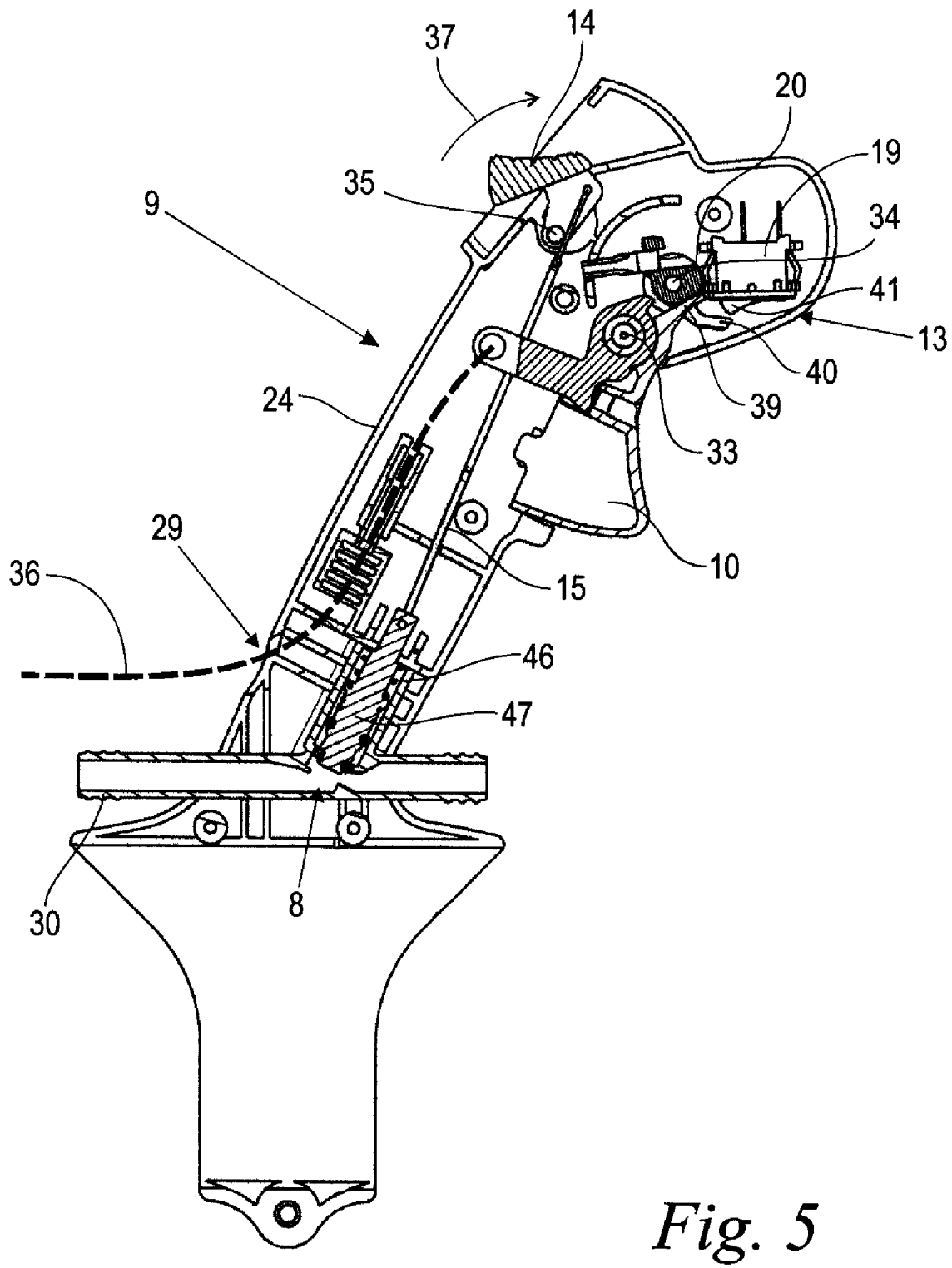
FIG. 5 shows the arrangement according to FIGS. 3 and 4 with completely suppressed spray pushbutton locked in an elbowjoint fashion for sprayer operation in permanent spraying mode.

The illustration according to FIG. 5 shows that the spray pushbutton 14 that has been suppressed by a partial range of its actuation travel according to FIG. 4 can be pushed farther in its actuation direction 37. When doing so, the transmission member 15 moves in accordance with the illustration of FIG. 5 past the pivot axis 35. The transmission member 15 extends thus on the side of the pivot axis 35 that is facing away from the part of the spray pushbutton 14 projecting from the handle 9. In this connection, the spray pushbutton 14 together with the transmission member 15 form an elbow joint. The elbow joint locks automatically when surpassing the preset adjusting travel stroke starting from the partially open position according to FIG. 4 to the completely suppressed position according to FIG. 5. The pulling load in the transmission member 15 acts with a leverage relative to the pivot axis 35 on the spray pushbutton 14 such that the pushbutton 14 is permanently secured in the suppressed position in the actuation direction 37. In this connection, the valve body 47 of the control valve 8 remains permanently in the open position. This causes a permanent spraying agent stream 6 in the spraying agent line 5 (FIG. 1) provided for a permanent spraying action.

It is also possible to provide an arrangement in which the actuation direction 37 is reversed so that the spray pushbutton 14 is to be actuated downwardly toward the blower tube 3 for opening the control valve 8. With regard to other features and reference numerals, the arrangements according to FIGS. 3 to 5 are identical to one another as well as to the embodiment according to FIGS. 1 and 2.

Figure 6:
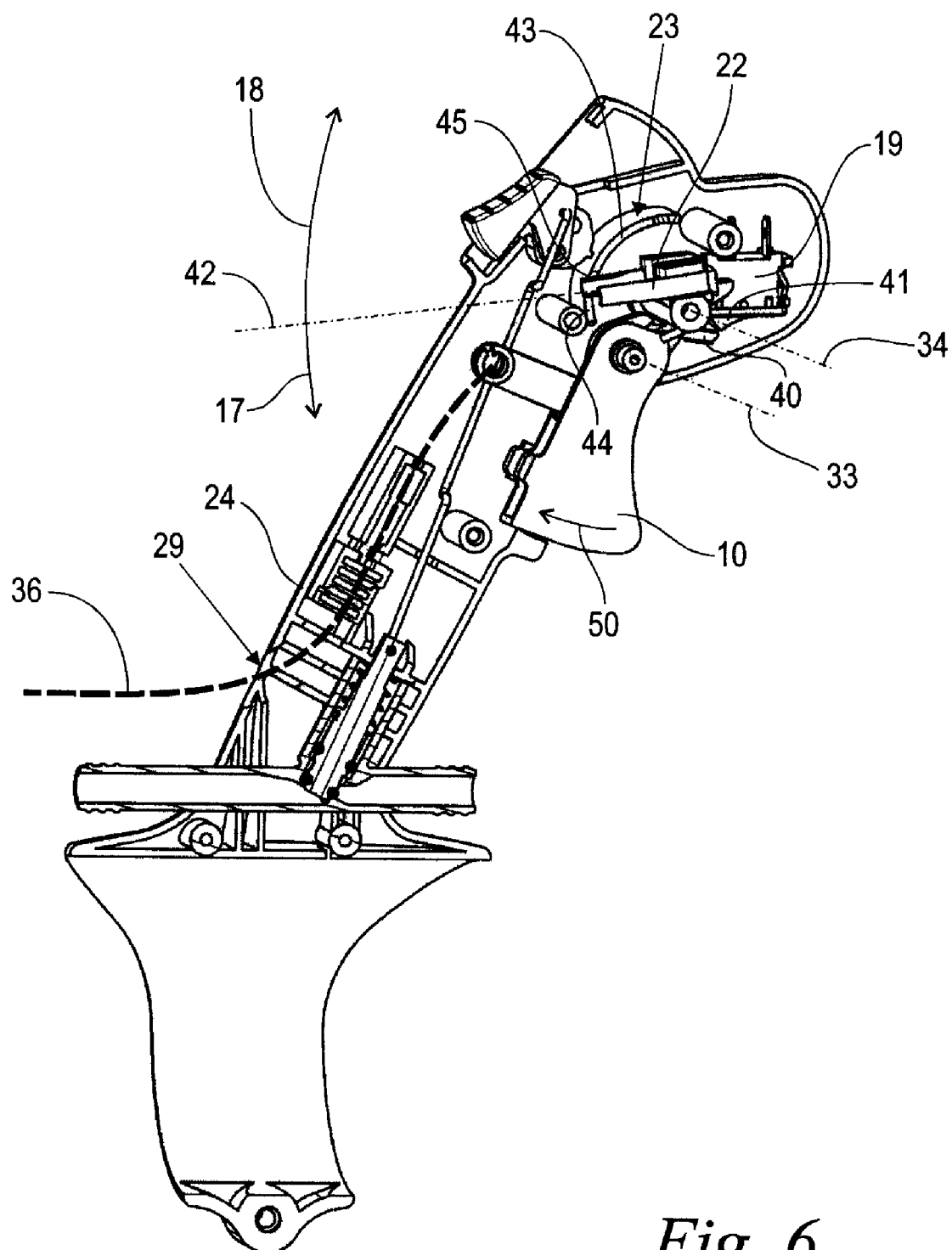
FIG. 6 shows the arrangement according to FIG. 3 in the rest position with further details of the throttle locking action and ignition interruption.
Figure 7:
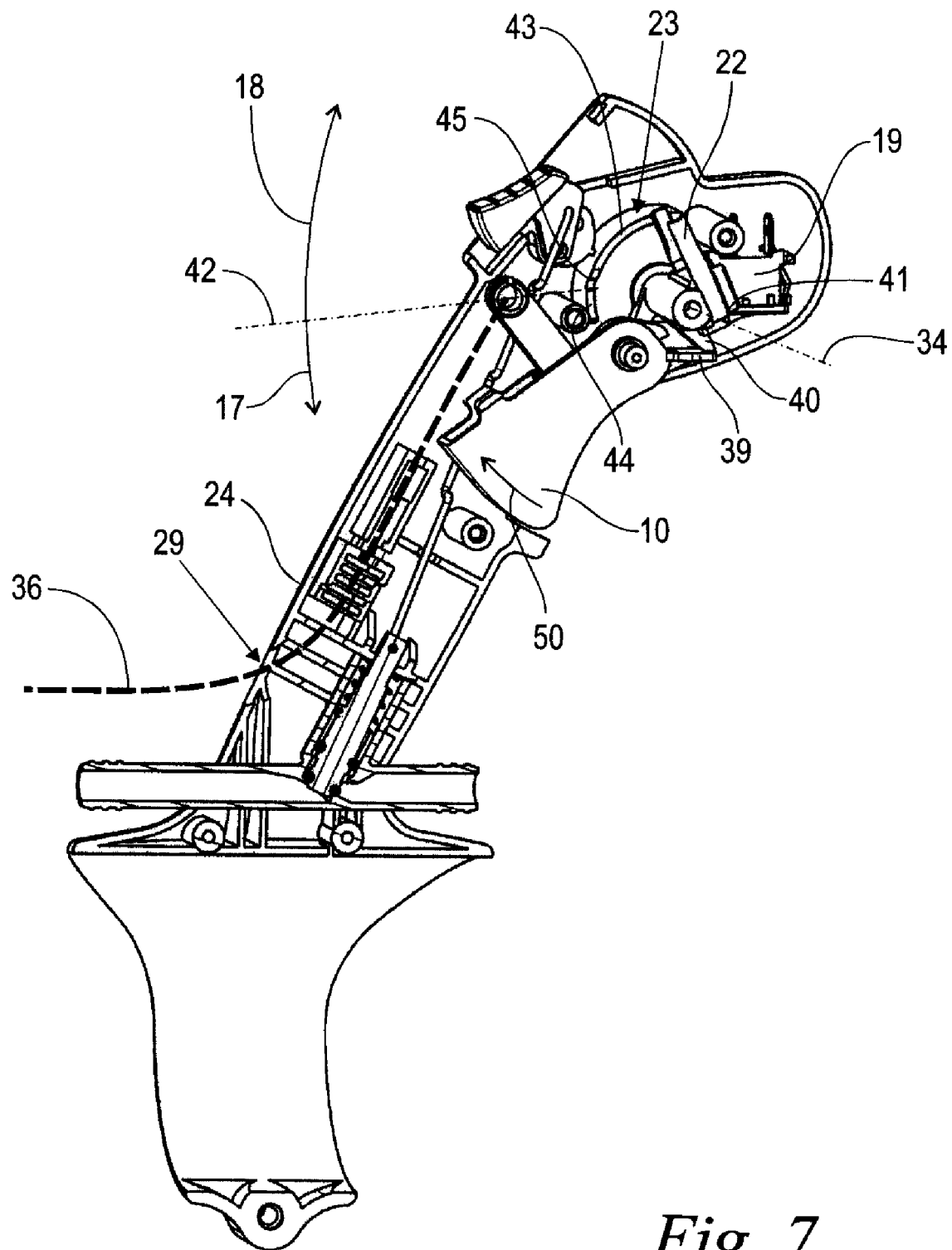
FIG. 7 shows the arrangement according to FIG. 6 in locked full throttle position.
Figure 8:
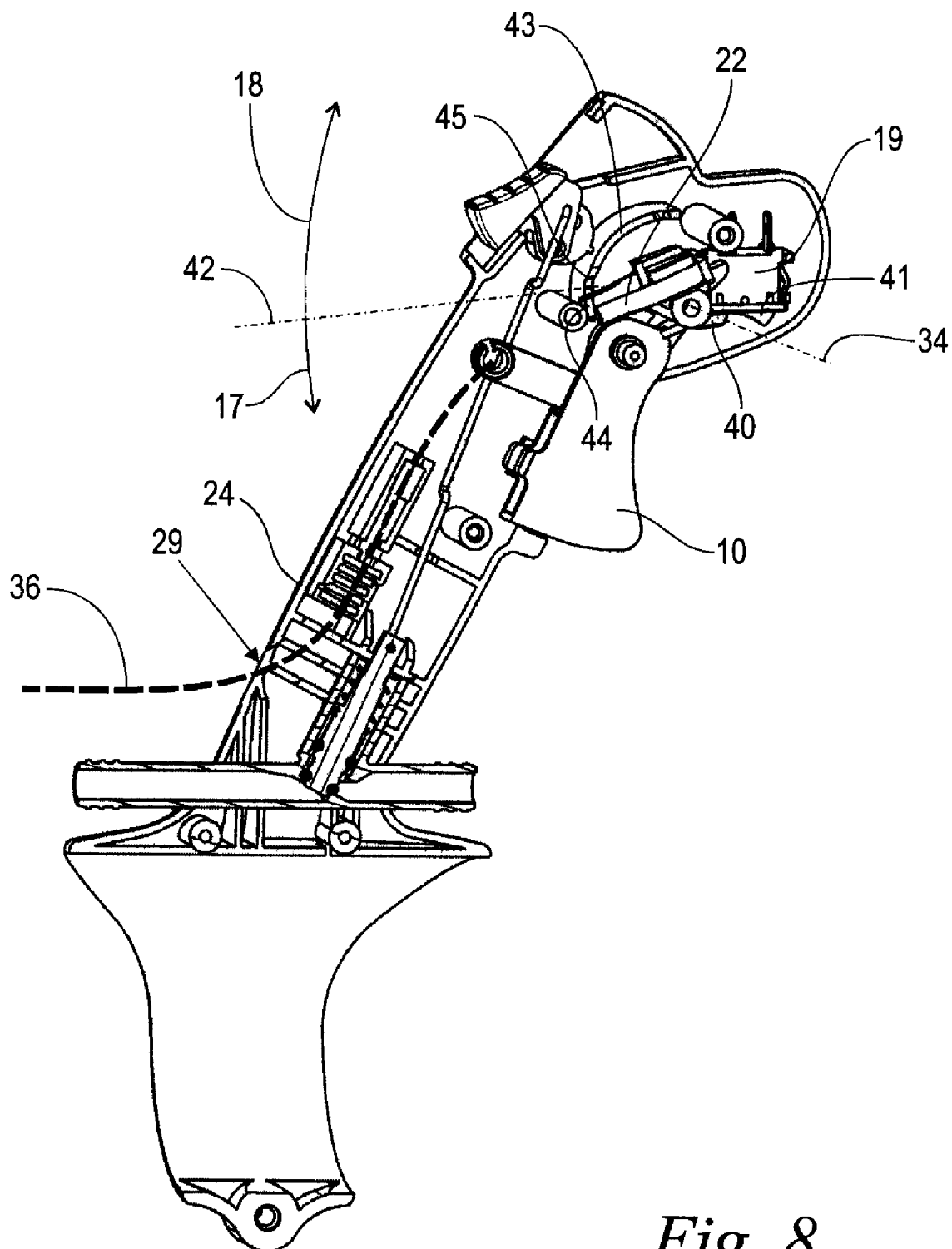
FIG. 8 shows the arrangement according to FIG. 6 with interruption of ignition.

Further control functions on the handle 9 result from the illustrations according to FIGS. 6 to 8: FIG. 6 shows the arrangement according to FIG. 3 in a slightly perspective illustration. It can be seen that on the inner side of the half shell 24 a slideway 23 is arranged that extends in an arc shape about the pivot axis 34 of the pivot lever 16. Mirror-symmetrically thereto, an identical slideway is provided in the opposite half shell 25 (FIG. 2). Between the two facing surfaces of the slideways 23, a friction spring 22 is clamped with pretension. For this purpose, the friction spring 22 is a U-shaped spring bracket in the illustrated embodiment and has two legs that under spring tension in the axial direction of the pivot axis 34 spread outwardly and rest under pretension against the two slideways 23. The friction spring is pivotable together with the pivot lever 16 (FIG. 2) about the pivot axis 34. The friction spring 22 that is fixedly connected to the pivot lever 16 is positioned relative to the pivot axis 34 approximately parallel to a neutral position 42 that has correlated therewith also the neutral position of the pivot lever 16 (FIG. 2). Starting from this neutral position 42, the friction spring 22 and the pivot lever 16 (FIG. 2) are pivoted together in the stop direction 17 or the locking direction 18, as desired.

The slideway 23 has in the area of the stop direction 17 a narrow section 44 and in the area of the locking direction a wide section 43 that is wider than the narrow section 44. Between both sections 43, 44 there is a slanted portion 45 that rises in axial direction toward the pivot axis 34. The lateral spacing between the narrow sections 44 of both slideways 23 is greater than the lateral spacing between the two wide sections 43. When actuating the pivot lever 16 in the locking direction 18, the spring tension of the friction spring 22 generates a friction force at the wide sections 43. This friction force can be overcome manually by actuation of the pivot lever 16 (FIG. 2) but prevents an accidental displacement.

When pivoting the pivot lever 16 (FIG. 2) in the stop direction 17, the legs of the friction spring 22 rest only with minimal pretension against the narrow sections 44. The resulting friction force can be manually overcome but prevents an accidental displacement of the pivot lever 16 (FIG. 2).

The intermediately positioned slanted portion 45 serves for detecting the neutral position 42. The friction force that changes suddenly upon moving onto the slanted portion 45 can be sensed by the user at the pivot lever 16 and signals that the neutral position 42 has been found. In the neutral position 42 according to FIG. 6, the pivot lever 16 (FIG. 2) is without function: the throttle control 10 and the interruption switch 19 are unaffected. The lever 40 is positioned at a spacing to the switching element 41; the ignition of the internal combustion engine 4 is switched on. The internal combustion engine 4 (FIG. 1) can be started and put into operation. The throttle control 10, beginning at the illustrated idle position, can be suppressed in the direction of arrow 50 about its pivot axis 33 in the direction of full throttle. The adjusting travel in the direction of arrow 50 is transmitted onto the carburetor of the internal combustion engine 4 (FIG. 1) by means of a schematically illustrated throttle pull 36 that passes through the passage 29 from the interior to the exterior. After releasing the throttle control 10, a return spring, not illustrated, of the carburetor of the internal combustion engine 4 (FIG. 1) returns the throttle control 10 into its idle position according to FIG. 6.

FIG. 7 shows the arrangement according to FIG. 6 with the pivot lever 16 (FIG. 2) pivoted in the locking direction 18. Accordingly, the friction spring 22 is also pivoted in the looking direction 18 by the same amount and secures by its friction force acting on the wide section 43 the pivot lever 16 (FIG. 2) in the full throttle position. The pivot movement of the pivot lever 16 (FIG. 2) is transmitted by means of the cam 20 illustrated in FIGS. 3 through 5 onto a contact surface 39 of the throttle control 10 so that the throttle control 10 remains also in the full throttle position. This full throttle position is transmitted by means of the throttle pull 36 onto the carburetor of the internal combustion engine 4 (FIG. 1).

Between the idle position according to FIG. 6 and the full throttle position according to FIG. 7, different intermediate positions can be adjusted by means of the pivot lever 16 (FIG.

2). The throttle control 10 is accordingly secured in any operating position and sets the desired motor output for permanent operation of the spraying device.

By pivoting the pivot lever 16 in the direction opposite to the locking direction 18, starting from the operating position of FIG. 7, first the neutral position 42 of FIG. 6 is reached. Upon further pivoting in the stop direction 17 (FIG. 8), the cam 20 (FIG. 3) will lift off the contact surface 39. The position of the throttle control 10 remains unaffected. When suppressing the pivot lever 16 (FIG. 2) in the stop direction 17, the lever 46 that is pivoted together with it will act on the switching element 41 of the interruption switch 19 (FIG. 8). The ignition of the internal combustion engine 4 (FIG. 1) is interrupted and the internal combustion engine 4 is thus switched off. Based on the switched-off position according to FIG. 8, the pivot lever 16 (FIG. 2) can be pivoted opposite to the stop direction 17 back into the neutral position 42. The switching element 41 of the interruption switch 19 returns into its operating position according to FIG. 6. The internal combustion engine 4 (FIG. 1) can be started up again.

With regard to other features and reference numerals, the arrangement according to FIGS. 6 to 8 is identical to that of FIGS. 1 to 5.

The specification incorporates by reference the entire disclosure of German priority document 10 2006 037 459.2 having a filing date of Aug. 10, 2006.

While specific embodiments of the invention have been shown and described in detail to illustrate the inventive principles, it will be understood that the invention may be embodied otherwise without departing from such principles.

What is claimed is:

1. A portable spraying device comprising:
an internal combustion engine;
a blower driven by the internal combustion engine;
a blower tube connected to the blower and conveying a blowing air stream generated in the blower;
a spraying agent reservoir;
a spraying agent line connected to the reservoir and conveying a spraying agent stream from the reservoir into the blowing air stream;
a control valve arranged in the spraying agent line;
a handle;
a throttle control acting on the internal combustion engine for controlling an engine output;
a stop switch acting on the internal combustion engine for interrupting ignition;
an actuating element acting on the control valve for actuating the control valve to control the spraying agent stream, wherein the actuating element is a spray pushbutton having an automatic restoring action at least over a portion of an actuating travel of the spray pushbutton;
wherein the handle has a handle head;
wherein the throttle control, the stop switch, and the spray pushbutton are arranged in the handle head;
a transmission member connected to the control valve, wherein the transmission member and the spray pushbutton that is pivotably supported in the handle head together form an elbow joint, wherein the elbow joint upon surpassing a predetermined travel stroke of the adjusting travel locks automatically.

2. The spraying device according to claim 1, wherein the control valve is a spring-loaded linear valve that opens when under a pulling load, wherein the transmission member is a pull rod.

3. The spraying device according to claim 1, wherein the spraying agent line extends through the handle and wherein the control valve is arranged within the handle.

4. The spraying device according to claim 1, wherein the stop switch acts as a locking element for the throttle control.

5. A portable spraying device comprising:
an internal combustion engine;
a blower driven by the internal combustion engine;
a blower tube connected to the blower and conveying a blowing air stream generated in the blower;
a spraying agent reservoir;
a spraying agent line connected to the reservoir and conveying a spraying agent stream from the reservoir into the blowing air stream;
a control valve arranged in the spraying agent line;
a handle;
a throttle control acting on the internal combustion engine for controlling an engine output;
a stop switch acting on the internal combustion engine for interrupting ignition, wherein the stop switch acts as a locking element for the throttle control;
an actuating element acting on the control valve for actuating the control valve to control the spraying agent stream;
wherein the handle has a handle head;
wherein the throttle control, the stop switch, and the actuating element are arranged in the handle head;
wherein the stop switch is a pivot lever that, starting from a neutral position, is pivotable in a stop direction and, when being pivoted in the stop direction, actuates an interruption switch, wherein the pivot lever is pivotable from the neutral position in a locking direction opposite to the stop direction and, when being pivoted in the locking direction, locks the throttle control in an operating position.

6. The spraying device according to claim 5, wherein the actuating element is a spray pushbutton having an automatic restoring action at least over a portion of an actuating travel of the spray pushbutton.

7. The spraying device according to claim 5, wherein the interruption switch is a microswitch.

8. The spraying device according to claim 5, wherein the pivot lever is coupled by coupling means to the throttle control in the locking direction such that with increasing actuating travel in the locking direction the throttle control is pivoted increasingly into a full throttle position.

9. The spraying device according to claim 8, wherein the coupling means is a cam disk or a rocker arm.

10. A portable spraying device comprising:
an internal combustion engine;
a blower driven by the internal combustion engine;
a blower tube connected to the blower and conveying a blowing air stream generated in the blower;
a spraying agent reservoir;
a spraying agent line connected to the reservoir and conveying a spraying agent stream from the reservoir into the blowing air stream;
a control valve arranged in the spraying agent line;
a handle;
a throttle control acting on the internal combustion engine for controlling an engine output;
a stop switch acting on the internal combustion engine for interrupting ignition, wherein the stop switch acts as a locking element for the throttle control;
an actuating element acting on the control valve for actuating the control valve to control the spraying agent stream;
wherein the handle has a handle head;
wherein the throttle control, the stop switch, and the actuating element are arranged in the handle head;

a friction spring connected to the stop switch, wherein the friction spring interacts with at least one slideway.

11. The spraying device according to claim 10, wherein the at least one slideway has a slanted portion.

12. The spraying device according to claim 10, wherein the friction spring is a U-shaped spring bracket that is moveably clamped between two of the at least one slideway, wherein said two slideways are arc-shaped, and wherein the spring bracket is moved by the pivot lever.

13. The spraying device according to claim 1, wherein the handle comprises two half shells that are detachably connected by a clamping action to the blower tube and surround the blower tube.

14. The spraying device according to claim 5, wherein the handle comprises two half shells that are detachably connected by a clamping action to the blower tube and surround the blower tube.

15. The spraying device according to claim 10, wherein the handle comprises two half shells that are detachably connected by a clamping action to the blower tube and surround the blower tube.

16. The spraying device according to claim 10, wherein the actuating element is a spray pushbutton having an automatic restoring action at least over a portion of an actuating travel of the spray pushbutton.

17. The spraying device according to claim 5, wherein the spraying agent line extends through the handle and wherein the control valve is arranged within the handle.

18. The spraying device according to claim 10, wherein the spraying agent line extends through the handle and wherein the control valve is arranged within the handle.

* * * * *